United States Patent [19]

Masuyama et al.

[11] 4,106,067
[45] Aug. 8, 1978

[54] MAGNETIC HEAD CLEANING JACKET

[75] Inventors: Kenichi Masuyama; Tsutomu Sugisaki; Tatsuji Kitamoto; Yasuyuki Yamada, all of Odawara, Japan

[73] Assignee: Fuji Photo Film Co., Ltd., Minami-ashigara, Japan

[21] Appl. No.: 724,430

[22] Filed: Sep. 17, 1976

[30] Foreign Application Priority Data

Sep. 19, 1975 [JP] Japan .................... 50-128741[U]

[51] Int. Cl.² .................... G11B 5/00; G11B 5/10; G11B 23/02
[52] U.S. Cl. .................... 360/137; 360/128; 360/133
[58] Field of Search ............ 360/137, 99, 128, 133, 360/135; 274/47; 15/210 R, 209 R

[56] References Cited

U.S. PATENT DOCUMENTS

| 3,668,658 | 6/1972 | Flores et al. | 360/133 |
| 3,864,755 | 2/1975 | Hargis | 360/99 |
| 3,931,644 | 1/1976 | Ward | 360/133 |

*Primary Examiner*—Vincent P. Canney
*Attorney, Agent, or Firm*—Sughrue, Rothwell, Mion, Zinn and Macpeak

[57] ABSTRACT

A cleaning jacket for a magnetic head used for flexible discs comprising a cleaning sheet and a sheet retaining jacket, the cleaning sheet comprising a flexible and non-magnetizable support, at least on one surface of which is provided an antistatic layer and on the other surface of which is provided a cleaning layer of a fibrous material, the retaining jacket having the shape of a flat casing and defining a space in which the cleaning sheet can be kept in such a manner that it can rotate freely therein, and, further, having a lubricating layer provided on the inner wall thereof facing the antistatic layer of the cleaning sheet.

5 Claims, 8 Drawing Figures

U.S. Patent  Aug. 8, 1978  Sheet 1 of 2  4,106,067
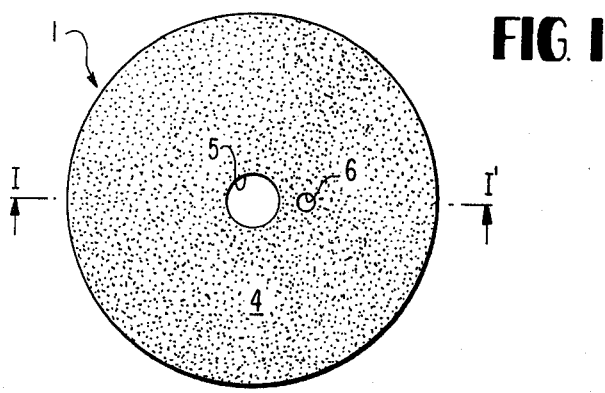
FIG. 1
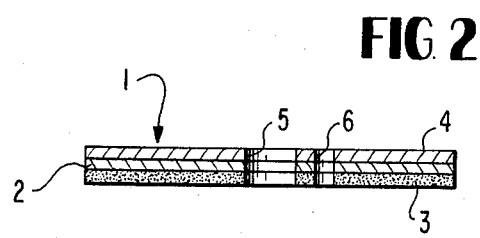
FIG. 2
FIG. 3
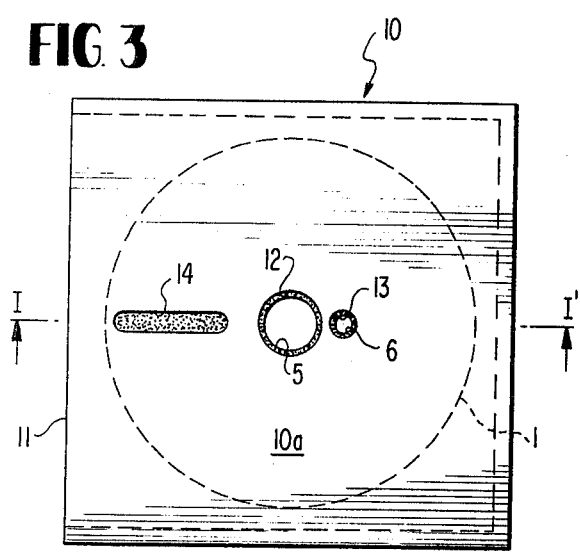
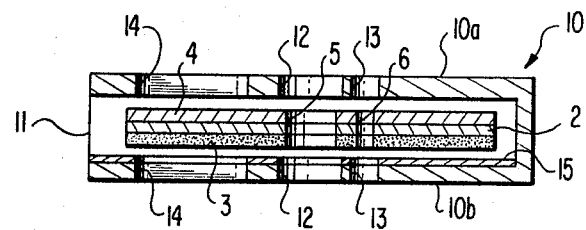
FIG. 4

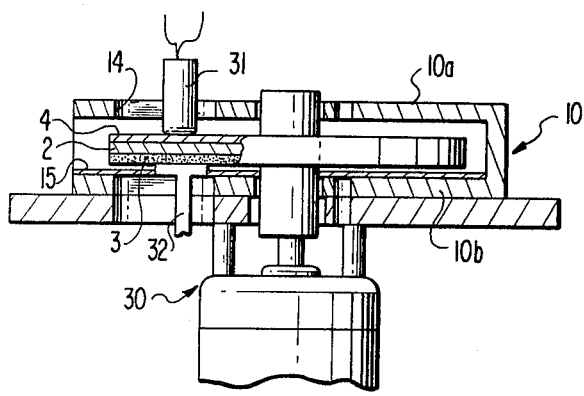
FIG. 5
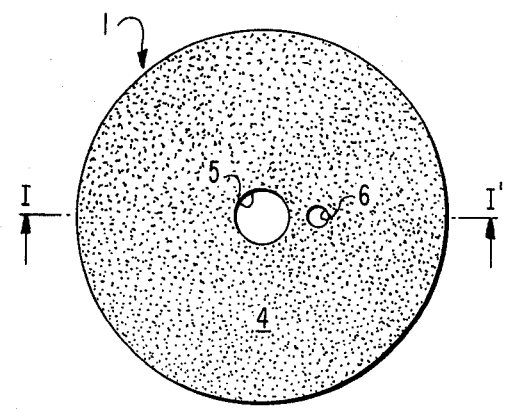
FIG. 6
FIG. 7
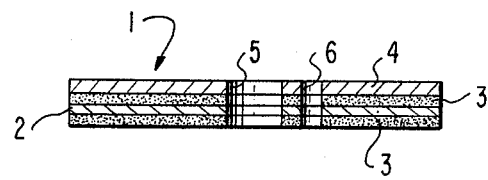
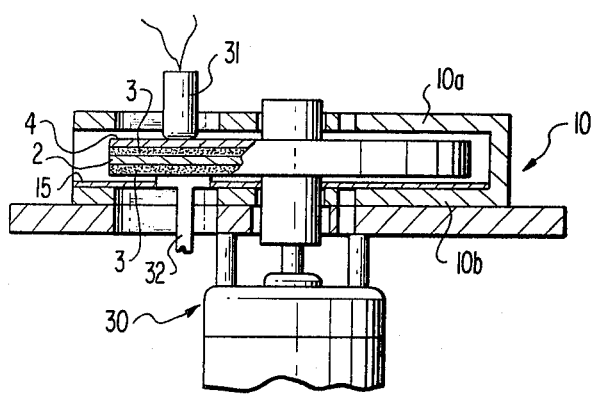
FIG. 8

MAGNETIC HEAD CLEANING JACKET

BACKGROUND OF THE INVENTION

1. Field of the Invention

This invention relates to a cleaning jacket for a magnetic recording head, particularly for one for use with flexible discs.

2. Description of the Prior Art

At present, magnetic memory recording methods can be classified into those using a magnetic disc, magnetic tape, cassette tape, etc., each of which has the following problems: the magnetic disc method is, in spite of its high recording density, costly; the magnetic tape method requires a large space which makes this method inferior to the former in handling; and the cassette tape method, characterized by compactness, suffers from a low recording volume as well as poor reliability.

Therefore, the flexible disc method, which has many advantages and is free of the above disadvantages, among these methods, i.e., high recording density and a compactness sufficient for easy handling, has recently prevailed in popularity.

Generally speaking, when a magnetic head is used for a long time in contact with a magnetic recording medium, a portion of the recording layer is abraded and adheres to the recording head together with lubricant, etc., which is present in a very small quantity on the magnetic recording layer, causing a lowering of the recording output of the magnetic head:

Such abrasion and accumulation of lubricant can be reduced by improving the magnetic recording layer.

However, as magnetic recording of the conventional type is principally based on intimate contact of the recording head and the recording layer which are in relative motion, the development of a magnetic recording layer provided with perfect mechanical performance (abrasion-free, etc.) is almost impossible to achieve.

Accordingly, one must assume soiling of the recording head will occur so long as one depends on the principles of present magnetic recording using magnetic recording media, and, thus, one is forced to resolve the soiling problem with recording heads by some cleaning method.

In the case of a flexible disc, the recording head is usually located in the innermost part of the apparatus, which makes it difficult to easily carry out head cleaning using a piece of cloth impregnated with a cleaning liquid as in the case of open reel tape recorders, cassette recorders and hame or broadcasting video recorders.

Commercially available head cleaning tapes which comprise a support such as polyester film and a cleaning layer consisting of an abrasive such as fused alumina, silicon carbide, chromium oxide ($Cr_2O_3$), corundum, etc., bonded with a suitable binder are conveniently used for the above-cited various types of magnetic heads. Though cleaning tape effectively grinds off smudges on the head mainly comprising abraded recording layer and lubricant, it also tends to abrade the head itself to an undesirable degree. Such problems are also encountered in the case of heads for magnetic video recorders.

SUMMARY OF THE INVENTION

Objects of the present invention are, therefore, to resolve the shortcomings and the inconveniences involved in conventional cleaning methods or devices for flexible disk magnetic heads, to accomplish cleaning in a very short period without promoting head abrasion, and to provide cleaning jackets of reasonable price with good handling conveniency.

Such objects of the present invention are realized by a cleaning jacket which comprises a cleaning sheet and a sheet storage jacket, the cleaning sheet comprising a flexible and non-magnetizable support on one surface of which is provided a cleaning layer of a fibrous material and at least on the other surface of which is coated an antistatic layer (the fibrous material may be provided on a second antistatic layer, if desired), and the jacket accomadating the cleaning sheet in such a manner that the sheet can freely rotate therein and being provided with a lubricating layer on the inner wall thereof facing the antistatic layer of said sheet.

BRIEF DESCRIPTION OF THE DRAWINGS

FIG. 1 is a plane view of a cleaning sheet of the present invention.

FIG. 2 is a cross sectional view of the cleaning sheet of FIG. 1 cut along the line I—I' in FIG. 1.

FIG. 3 is a plane view of a jacket of the present invention.

FIG. 4 is a cross-sectional view of the jacket of FIG. 3 cut along line I—I' in FIG. 3.

FIG. 5 illustrates the jacket loaded in a flexible disk recorder in the state of a head cleaning operation.

FIGS. 6 – 8 correspondingly illustrate another embodiment of the present invention; FIG. 6 is a plane view of a cleaning sheet, FIG. 7 a cross-sectional view thereof cut along line I—I' of FIG. 6, and FIG. 8 shows the cleaning jacket loaded in a magnetic sheet recorder and operating to clean the magnetic head.

Numerals correspond to the following: 1 — cleaning sheet; 2 — support; 3 — antistatic layer; 4 — fibrous material layer; 10 — cleaning jacket; and 15 lubricating layer.

DETAILED DESCRIPTION OF THE INVENTION

In the following, one typical embodiment of a cleaning jacket of the present invention will be described with reference to the accompanying drawings.

In FIGS. 1 and 2 are illustrated a cleaning sheet 1 which comprises a doughnut-shaped, flexible and non-magnetizable support 2 provided with a center hole 5 and an aperture 6 for a light sector (a light sector is often called an index hole in the art; this enables the recording position to be easily located in conventional recording devices). On one surface of the support 2 is coated an antistatic layer 3 and the other surface of the support 2 is provided a fibrous material layer 4.

Support 2 can be freely selected from non-magnetic flexible materials, applying conventional techniques in the art. Thus, the nature of support 2 is not substantially limited. Suitable materials for support 2 include plastic sheets such as polyvinyl chloride, polycarbonate, acrylonitrile-styrene copolymers, ABS resin, polyesters, e.g., polyethylene terephthalate, alkyd resins, maleic acid resins, etc., glass fiber reinforced polyester, with useful polyesters being as earlier exemplified; a typical commercial example of such a material is ERP (glass fiber/tempered plastic; such are typically produced by combining an unsaturated polyester resin and a glass fiber, the glass fiber being selected from non-alkaline glass which is free of $Na_2O$ or $K_2O$), cellulose derivatives, e.g., polyethylene terephthalate, alkyl resins, maleic acid resins, etc, paper or card board, metal plates comprising aluminum or copper, glass plates etc.

A suitable thickness for support 2 is from about 10 μ to about 1 mm, which can be selected depending upon the use of the apparatus.

Antistatic layer 3 can be prepared by coating a coating mixture comprising a finely-divided, electically conductive material such as carbon black, graphite, lamp black (acetylene black or thermal black, etc.), channel black (furnace black, etc.), etc., and a binder. Most preferably, the finely-divided electrically conductive materials have a particle size of from about 15 μ to about 400 μ, even more preferably 20 μ to 200 μ. The antistatic layer preferably exhibits a surface electrical resistance (after drying and coating) of about $1 \times 10^{12} \Omega/sq.$, at highest even more preferably $5 \times 10^9 \Omega/sq.$, at highest.

Suitable binder materials include thermoplastic resins as are disclosed in the following Japanese Patent Publications Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22069/1972, 22070/1972, 27886/1972, etc., and which have a softening point of 150° C or below, an average molecular weight of from about $10^4$ to about $2 \times 10^5$, and a degree of polymerization of from about 200 to about 500.

Specific examples of such materials include are vinyl chloride-vinyl acetate copolymers, vinyl chloride-vinylidene chloride copolymers, vinyl chloride-acrylonitrile copolymers, acrylic ester-acrylonitrile copolymers, acrylic ester-styrene copolymers, acrylic ester-vinylidene chloride copolymers, methacrylic ester-acrylonitrile copolymers, methacrylic ester-vinylidene chloride copolymers, methacrylic ester-styrene copolymers, urethane elastomers, e.g., of the thermosetting type such as those comprising a polyether/diamine group, a polyester / diamine group, a polyester / glycol group, a polyether / glycol group, etc., and of the thermoplastic type, e.g., polyvinyl fluoride, vinylidene chloride-acrylonitrile copolymers, butadiene-acrylonitrile copolymers, polyamide resins, e.g., poly-condensates of a dicarboxylic acid and a diamine, poly-condensates of ω-aminocarboxylic acid aromatic polyamides, etc., polyvinyl butyral, cellulose derivatives (e.g., cellulose acetate butyrate, cellulose diacetate, cellulose triacetate, cellulose propionate, nitrocellulose), styrene-butadiene copolymers, polyester resins, e.g., polyethylene terephthalate, urethane rubber, polyurethane and the like, chlorovinyl ether-acrylic ester copolymers, various synthetic rubbers, e.g., BR(butadiene rubber), IR(isoprene rubber), CR(chloroprene rubber), ABR(acrylate butadiene rubber), IIR(isobutene-isoprene rubber), NBR(nitrile-butadiene rubber), NCR(nitrile-chloroprene rubber), PBR(pyridine-butadiene rubber), SBR(styrene-butadiene rubber), SCR(styrene-chloroprene rubber), SIR(styrene-isoprene rubber), etc. and mixtures thereof.

Thermosetting resins such as are disclosed in the follwing Japanese Patent Publications can also be used: 8103/1964, 9779/1965, 7192/1966 (U.S. Pat. No. 3,437,510, 8016/1966 (U.S. application Ser. No. 308,692), 14275/1966 (U.S. Pat. No. 3,507,694), 18179/1967 (U.S. Pat. No. 3,404,997), 12081/1968 (U.S. Pat. No. 3,574,684), 28023/1969 (U.S. Pat. No. 3,630,771), 14501/1970, 24902/1970, 13103/1971, 22065/1972, 22066/1972, 22067/1972, 22072/1972, 22073/1972 (U.S. Pat. No. 3,630,771), 28045/1972, 28048/1972, 28922/1972 (U.S. Pat. No. 3,690,946), etc.

These thermosetting (or reactive resins as they are sometimes termed at lower molecular weights) desirably have a molecular weight not exceeding $2 \times 10^5$ when they are in coating liquid form, and when coated and heated after drying, increase in molecular weight to infinity via a condensation or addition reaction.

Further, with the thermosetting resins, such materials are preferred which do not soften or melt until thermal decomposition takes place, including, for example, phenol resins, epoxy resins, thermosetting polyurethane resins, urea-formaldehyde resins, melamine-formaldehyde resins, alkyd resins, silicone resins, acrylic functional resins, epoxy-polyamide resins, nitrocellulose-melamine resins, a mixture of a high molecular weight polyester resin with an isocyanate prepolymer, a mixture of a copolymer of methacrylic acid with a diisocyanate prepolymer, a mixture comprising a polyester-polyol and a polyisocyanate, a mixture comprising a low molecular weight glycol, a high molecular weight diol and triphenylmethane triisocyanate, a polyamine resin, mixtures thereof, etc.

A finely-divided, electrically conductive material is mixed with a binder selected from the above cited materials in a weight/weight ratio of from 100 : 10 to 100 : 200, i.e., 100 parts of electrically conductive material in combination with from 10 to 200 parts of binder.

To the resulting mixture, there can further be added a dispersing aid, a lubricant, an abrasive, an organic solvent, etc., if desired or necessary, to prepare a coating mixture, which is coated on one surface of a support as hereinbefore described by any desired coating methods, e.g., as described in detail in "Coating Technology(Kohtingu Kohgaku)" published by Asakura Book Store (Mar. 20, 1971) at page 253–277, including air doctor, blade, air knife, squeeze, dip, reverse roll, transfer roll, gravure, kiss, cast, and spray coating. A preferred range of the coating thickness is from 3 to 8 microns, usually from 1 to 10 microns, dry basis.

Fibrous material layer 4 can be formed by providing on the other side of support 2 a layer of a non-woven fabric, a synthetic leather, leather, woven cloth of synthetic or natural fibers, or Japanese paper fiber, using a suitable adhesive or by the application of heat and pressure (thermocompression bonding). The amount of adhesive utilized is not limited in any particular fashion, so long as a desired adhesive effect is obtained. The amounts utilized can be freely varied and will be obvious to one skilled in the art in view of the disclosure. Correspondingly, the heat and pressure selected for the thermocompressive bonding will obviously depend upon the type of binder selected; usually, a temperature on the order of about 80° to about 200° C is used for most thermoplastic and thermosetting materials. Pressures on the order of about 0.1 to about 20 Kg/cm², even more preferably from about 0.5 to about 5 Kg/cm², are utilized. The thickness of layer 4 is preferably from about 20 to about 200 microns, more preferably from 30 to 100 microns. The general characteristics which any fibrous material must illustrate are that the coefficient of friction must be small and fiber pilling must scarcely occur to decrease rotary torque. To avoid "drop-out", the material should be soft and should provide a "cushioning" effect, and the fibrous material should illustrate low electrification capability.

Non-woven fabrics for use in cleaning layer 4 imply clothlike products produced by orienting fibers of, e.g., cellulose acetate fiber, nylon, polyester, etc., by a suitable means in the form of web or of mat, and by bonding the oriented fibers with an adhesive such as a natural latex, e.g., gum arabic, gum traganth, synthetic latices which may be used together with urea-formalkehyde resin, or melamine-formaldehyde resin, or by utilizing the adhesive force of the fibers themselves, e.g., when using polyethylene, polypropylene or a polyamide.

Synthetic latices suited for such an adhesive include acrylonitrile-butadiene copolymers or other acrylonitrile copolymers, e.g., acrylonitrile-styrene copolymers, etc. When an adhesive is used, the coating or impregnation rate is generally from about 10 to about 150 wt.% of adhesive (solids content) based on the weight of the oriented fibers involved. Higher or lower amounts can be used, of course, and this range is to be construed as merely illustrative. Non-woven fabrics of the heat-bondable type can also be used for the present invention, i.e., fusion bonding can be also used, e.g., polyesters, polystyrenes and polyvinyl acetate, with usually a temperature of about 70° to about 250° C being used for the bonding.

Suitable materials for woven cloth of a synthetic fiber include polyamides such as nylon-6,6, nylon-6,10, etc., polyesters such as polyethylene terephthalate, polyethylene naphthalate, etc., polyurethanes(which are a reaction product between a prepolymer prepared by reaction of a polyester or a polyether with a diisocyanate compound and a hydrazine, diamine or diol, for example, Spandex, which is produced by du Pont, under the tradename Lycra), polyolefins such as polyethylene or polypropylene, and other polymer materials such as polystyrene, polyvinyl chloride, polyvinylidene chloride, polyethylene fluoride, polyacrylonitrile, polyvinyl alcohol, etc.

Woven clothe of natural fibers comprises protein fibers such as wool, silk, etc., or cellulosic fibers such as cotton, jute, etc.

Typical examples of useful synthetic leathers are the polyurethane and/or vinyl chloride synthetic leathers.

Japanese paper is made from natural fibers, cellulose fibers being preferred, using bast fibers as a raw material, digesting the fibers to make single fibers and then making a paper therefrom. Bast fibers consist of celluloses about 3 to about 50 mm long by about 0.01 to about 0.08 mm wide. Examples of such are flax, hemp, jute, ramie, kozo, mitsumata and gampi. Of these fibers, kozo, mitsumata and gampi are preferred.

These fibrous materials can be bonded by an adhesive, or by the application of heat and pressure, to the other surface of the above-described support 2. Such materials are most preferably impregnated into the fibrous layer in an amount of 0.5 wt.% to 10 wt.%, as solids basis, based on the weight of the fibrous layer.

The impregnation of a silicone oil (e.g., SH 8400, SH 8412, produced by Toray Silicone K.K.; Silicone oil SH 8400 corresponds to DCFF-400 Fiber Finish of Dow Corning Corp. and SH 8412 corresponds to DC FF-412 Fiber FInish of Dow Corning Corp.) or a fluorinated oil (e.g., Daifloil produced by Daikin Kogyo K.K. (trifluorochloroethylene polymer of a low degree of polymerization) in such a fibrous layer has proven to be quite effective to prevent head soiling after cleaning. Synthetic latexes and such latexes in combination with a urea or melamine resin adhesive, a synthetic rubber (examples of the rubbers utilized to form the synthetic rubber latices include the same synthetic rubbers as are recited as suitable binder materials for the finely-divided, electrically conductive material) a polyester, a vinyl acetate resin, a butyral resin, an acrylate resin, a vinyl chloride resin, a polyamide, a reclaimed rubber, starch, dextrin, glue, gum arabic, casein, polyvinyl alcohol, polyacrylamide, carboxymethyl cellulose, rosins, wax, paraffin, epoxy resins, isocyanate resins, phenyl resins, furan resins, nitrocellulose, etc. Preferred are those resins whcih have a softening point of about 30° to about 150° C, most preferably 50° to 120° C, and a molecular weight of about 1,000 to about 100,000. They are conveniently applied with a spray-gun, brush, blade, spatula, etc.

When the fibrous material is bonded to the surface of support 2 by thermocompression bonding, it is necessary that either of the fibrous material, a material comprising the fibrous material at least in part, e.g., a surface layer, or the support 2 contains a thermoplastic material (for example, the adhesive for a non-woven fabric may contain a thermoplastic material; preferred thermoplastic materials have a softening temperature of 150° C or less, an average molecular weight of 10,000 to 200,000 and a degree of polymerization of 200 to 500.); more preferably, both of these contain a thermoplastic material.

In FIGS. 3 and 4 there is illustrated a jacket 10 of the flat case type comprising a 1 to 5 mm thick paper board or hard vinyl chloride plate and enclosing a space in which the cleaning sheet 1 described above can freely rotate. Jacket 10 has at its side wall an opening 11 through which the cleaning sheet 1 can be inserted and removed, and in each of top cover 10a and the bottom plate 10b there is provided a center hole 12 of slightly greater diameter than center hole 5 of the sheet, another hole 13 also slightly greater than aperture 6 of the sheet for the light sector, and a linear aperture 14 through which a magnetic head can be inserted. Hole 13 may be eliminated when a light sector is not used. Further, linear aperture 14 need not be perforated through bottom plate 10b when a load pad (later described) is not used. On the inner side of bottom plate 10b of jacket 10, which faces antistatic layer 3, there is provided lubricating layer 15 for the purpose of insuring smooth rotation of cleaning sheet 1. Such a lubricating layer 15, which can be prepared by substantially the same methods as those described hereinbefore for the preparation of the fibrous layer 4, comprises a synthetic paper, e.g., a synthetic paper such as a mixture of wood pulp and NBR at a wt. ratio of pulp : NBR of 1 : 0.1 - 1, or non-woven fabric impreganted with a silicone resin, Teflon, a silicone oil, etc. Exaples of useful non-woven fabrics include those which are used to form the cleaning sheet. Examples of useful silicone oil include SH 8400 (produced by Toray Silicon K.K.), SH 8412 (produced by Toray Silicon K.K.), KF 96 (Shinetsu Chemical Co., Ltd.) and SF 96 (produced by G.E.), and examples of silicone resins include copolymers of dimethylpolysiloxane, monomethylpolysiloxane and polysiloxanes and the like.

The cleaning jacket of the present invention comprises such a jacket 10 and a cleaning sheet 1 installed in the jacket in the manner as illustrated in FIG. 4.

The operational mode of such a jacket will be explaned. Cleaning sheet 1 installed in jacket 10 as shown in FIG. 4 is loaded in a flexible disk recorder 30 together with jacket 10 as is shown in FIG. 5. Cleaning sheet 1 is rotated as a flexible magnetic disk, whereby cleaning sheet 1 begins to rotate very smoothly with a markedly reduced starting torque due to the lubricating action of the lubricating layer 15 assisted by the antistatic effect of anti-static layer 3. After cleaning sheet 1 reaches a pre-determined rate of rotation (for example, with a floppy disc of the IBM 3740 type 360 rpm, and for a magnetic sheet, 3600 rpm) magnetic head 31 is inserted downwardly through linear aperture 14 in upper cover 10a and brought into frictional contact with fibrous layer 4 of sheet 1. If desired or necessary, load pad 32 is applied against the rear surface of the sheet through linear aperture 14 in the bottom plate 10b to prevent the sheet from hanging down or drooping due to the contact with the magnetic head 31.

Usually, the duration of contact is from several to several ten seconds, usually at least 10 seconds, and dust, foreign substances, smudges, etc., adhering to head 31 are almost perfectly wiped off onto fibrous layer 4. Thus, cleaning of the head surface is finished in a very short time. There is no difference in the basic operation of the jacket when the spatial relationship of fibrous layer 4 to antistatic layer 3 and lubricating layer 15 is reversed along the vertical axis according to the structure of the recorder, i.e., the head is inserted from below and the jacket is flipped.

The shape of cleaning sheet 1 and jacket 10 can be circular, elliptic or rectangular, so long as the jacket cleaning sheet 1 can rotate without disturbance.

Other practical embodiments of jackets designed according to the present invention are further illustrated in FIGS. 6, 7 and 8 wherein cleaning sheet 1 is characterized by an antistatic layer provided on both sufaces of support 2 and a fibrous layer 4 is provided on one surface of the antistatic layer.

In these embodiments, jacket 10 retaining cleaning sheet 1 has essentially an equivalent structure and performs the same functions as those described hereinbefore, i.e., it is characterized by one inner wall which faces antistatic layer 3 which has no fibrous material layer thereon being provided with lubricating layer 15 as earlier described.

Cleaning jackets thus constructed exhibit an improved antistatic effect in the cleaning of a magnetic head, and impart a more reduced starting torque to the cleaning sheet, thus enabling it to rotate very smoothly.

Cleaning jackets described heretofore and produced in accordance with the present invention have the following, advantages: 1) Antistatic layer 3 provided on at least one suface of the support remarkably reduces electrostatic charges frictionally generated when cleaning sheet 1 begins to rotate, and consequently the starting torque is markedly reduced, ensuring very soomth rotation of the sheet. 2) Lubricating layer 15 provided on the inner wall of jacket 10, the wall facing an antistatic layer 3 which is provided on the surface other than that coated with fibrous material layer 4, noticeably lowers the frictional resistance of cleaning sheet 1 at the start of rotation as well as during the rotation thereof, thus considerably reducing the starting torque of sheet 1 as well as the frictional wearing of the sheet.

These advantages of cleaning jacket realized by the present invention will be illustrated in more detail in the following examples.

EXAMPLE 1

An antistatic layer was provided on one surface of a 75 micron thick polyethylene terephthalate film support by coating a coating mixture of the following composition so as to give a dry thickness of 3 microns by gravure coating and then drying.

| Coating composition | | |
|---|---|---|
| 1) | Carbon black (average particle dimensions-0.1 $\mu$ × 0.2 $\mu$) | 300 parts by weight |
| 2) | A copolymer of vinyl chloride and vinyl acetate (87:13 wt. %, average degree of polymerization = 300) | 30 parts by weight |
| 3) | An epoxy resin (epoxy equivalent- 450 to 500; molecular weight- 900; melting point- 64 to 74° C) | 27 parts by weight |
| 4) | A polyamide resin (condensation product of a polyfatty acid and a di-amine; amine value 300, average molecular weight 2500) | 15 parts by weight |
| 5) | Methyl ethyl ketone | 600 parts by weight |

On the other surface of the film there was then coated a heat-fused thermoplastic adhesive (Stafix, a product of Fuji Photo Film Co., Ltd.; polyester adhesive comprising an aromatic dibasic acid and two or more glycols; thickness on the order 10 $\mu$ to 50 $\mu$), on which layer a non-woven fabric 200 microns thick (Vilene #3000, a product of Japan Vilene Co., a copolymer of polyethylene terephthalate (60 mol%) and rayon (40 mol%) bonded using styrenebutadiene rubber as an adhesive and formed into a sheet.) was laminated by appling 1 Kg/cm pressure at 100° C[heating for one minute use a pair of heated pressure rollers(the time, of course, is not limited; in this particular example, the diameter of the heating roll was 40 cm, the web being passed around one heating roll prior to passing between the two heating rolls; typically, the contact time is on the order of 1 second to 2 minutes)]. After cooling to room temperature, the resulting film was cut to doughnut-shaped peices as shown in FIG. 1, with an outer diameter of 200±0.5 mm and an inner diameter of 25.4±0.05 mm. Each piece serves as cleaning sheet.

Separately, a flat case as shown in FIG. 3 was formed of a 0.25 mm thick hard polyvinyl chloride resin sheet. On the inner, bottom wall of the case was bonded a 200 micron thick nonwoven fabric layer (Vilene TR-35, a product of Sanko Vilene Co.) impregnated with silicone oil (the rate of impregnation with silicon oil was 1 to 2 wt.%, based on the weight of the fabric layer), by means of a hot press at 1 Kg/cm$^2$ and 200° C. The resulting jacket had planer dimensions of 20.5 cm × 20.5 cm with an inner space for the cleaning sheet of 1.0 mm in the direction of sheet thickness.

The cleaning sheet and the jacket thus produced were loaded in a flexible disc recorder as shown in FIG. 5. As the sheet was rotated at 360 r.p.m. and the magnetic head was brought into frictional contact from above with the fibrous material layer of the sheet, the condition of the rotating sheet was observed and the electric resistance of the lower surface of the sheet was measured (the lower surface means not the fibrous material layer but the other surface having the antistatic layer.)

It was confirmed that the cleaning sheet rotated very smoothly immediately after start-up while the surface electric resistance of the lower surface of the sheet remained within $10^7$ to $10^3$ $\Omega$/sq., even after prolonged rotation, which proved that a smooth rotation of the sheet was maintained.

EXAMPLE 2

On both surfaces of a support comprising a 75 micron thick polyethylene terephthalate film there was coated an antistatic layer of 3 microns thickness comprising the same composition as the anti-static layer in Example 1 by gravure coating.

On one surface of the resulting film was provided a layer the same as the layer of the same non-woven fabric as in Example 1 by the same method as in Example 1. Further, the film was similarly processed to provided a doughnut-shaped cleaning sheet. A jacket was produced in the same manner as in Example 1 to obtain a jacket of the same material, shape and size as in Example 1.

The cleaning sheet and the jacket thus produced were loaded in a flexible disc recorder in the manner as shown in FIG. 5. As the sheet was rotated at 360 r.p.m., and the magnetic head was brought into frictional contact from above with the fibrous material layer of the sheet, the condition of the rotating sheet was observed and the electric resistance of the lower surface of the sheet was measured. (The lower surface implies not the fibrous material layer but the surface having the antistatic layer).

It was confirmed that the cleaning sheet rotated very smoothly immediately after start-up while the surface electric resistance of the lower surface of the sheet remained within $10^6$ to $10^3$ $\Omega$/sq., even after prolonged rotation, which proved that a smooth rotation of the sheet was maintained.

Comparative Example 1

On one surface of a 50 micron thick polyvinyl chloride sheet a coating mixture of the following composition was coated and dried to prepare a cleaning sheet with an abrasive layer, the abrasive layer being about 3 to 8 u thick.

| | |
|---|---|
| $Cr_2O_3$ (an abrasive collected below a 10,000 mesh screen sieve) | 100 parts by weight |
| An epoxy resin* | 30 parts by weight |
| A polyamide resin* | 30 parts by weight |
| A vinyl chloride-vinyl acetate copolymer (70 to 90 : 30 to 10 wt.% vinyl chloride: vinyl acetate ; polymerization degree 400 to 600) | 40 parts by weight |
| butanol | 50 parts by weight |
| methyl ethyl ketone | 450 parts by weight |

*The same as used in Example 1 for both materials.

The film was cut into pieces in the same manner as in Example 1. The doughnut-shaped sheet was installed in a jacket which was equivalent to the one described in Example 1 except that it had no lubricating layer on its inside wall, and the jacket with the sheet was loaded into a flexible disc recorder. As the cleaning sheet was rotated at 360 r.p.m. and the magnetic head was brought into frictional contact from above with the rotating sheet, the stability of the sheet rotation was observed and the electric resistance of the lower surface of the sheet was measured (the lower surface corresponds, in this case, to the untreated surface of the polyvinyl chloride sheet).

It was confirmed that with this cleaning sheet at the initiation of rotation there was a lack of smoothness, and that the lower surface thereof firmly adhered to the bottom plate of the jacket, stopping rotation after 5 minutes.

The sheet was subjected to surface electric resistance measurement at the lower surface immediately after it stopped. The value was $10^{16}$ to $10^{14}$ $\Omega$/sq.

While the invention has been described in detail and with reference to specific embodiments thereof, it will be apparent to one skilled in the art that various changes and modifications can be made therein without departing from the spirit and scope thereof.

What is claimed is:

1. A cleaning jacket for a magnetic head used for a flexible disc comprising a cleaning sheet and a sheet retaining jacket, wherein the cleaning sheet comprises a flexible and non-magnetizable support, on at least one surface of which is provided an antistatic layer and on the other surface of which is provided a cleaning layer of a fibrous material, said antistatic layer comprising carbon black or graphite dispersed in a binder and said cleaning layer being made of non-woven fabric, the retaining jacket having the shape of a flat casing and defining a space in which the cleaning sheet can be kept in such a manner that it can rotate freely therein, said retaining jacket further having a lubricating layer provided on the inner wall thereof facing the antistatic layer of the cleaning sheet, said lubricating layer being made of non-woven fabric in which silicone oil or silicone resin is impregnated.

2. The cleaning jacket of claim 1, wherein said flexible and non-magnetizable support is selected from the group consisting of a natural or synthetic resin, a paper, a metal or glass.

3. The cleaning jacket of claim 1, whrein said finely-divided, electircally conductive material is utilized in combination with said binder at a weight/weight ratio of 100 parts of said finely-divided, electrically conductive material in combination with from 10 to 200 parts of said binder.

4. The recording jacket of claim 3, wherein said finely-divided, electrically conductive material has a particle size of from about 15 $\mu$ to about 400 $\mu$.

5. The cleaning jacket of claim 4 wherein said antistatic layer has a surface electrical resistance, after drying and coating thereof, of about 1 $\times$ $10^{12}$ $\Omega$/sq. at highest.

* * * * *